United States Patent [19]

Dickinson et al.

[11] 4,270,415

[45] Jun. 2, 1981

[54] TRACTION-DRIVE TRANSMISSION WITH HYDRAULIC CONTROL

[75] Inventors: Thorn W. Dickinson, Berlin; Daniel R. McLarty; Thomas F. Lyons, Jr., both of Plantsville, all of Conn.

[73] Assignee: Textron Inc., Providence, R.I.

[21] Appl. No.: 19,558

[22] Filed: Mar. 12, 1979

[51] Int. Cl.³ ............................................ B60K 41/14
[52] U.S. Cl. ...................................... 74/867; 74/193; 74/208; 74/690
[58] Field of Search ................ 74/690, 691, 688, 193, 74/208, 867, 868, 869, 191

[56] References Cited

U.S. PATENT DOCUMENTS

| | | | |
|---|---|---|---|
| 3,238,816 | 3/1966 | Schottler | 74/690 |
| 3,299,743 | 1/1967 | Stockton | 74/690 |
| 4,098,145 | 7/1978 | Dickinson | 74/191 X |
| 4,174,640 | 11/1979 | Dickinson | 74/690 |
| 4,185,509 | 1/1980 | McLarty | 74/690 |

*Primary Examiner*—H. Hampton Hunter
*Attorney, Agent, or Firm*—Hopgood, Calimafde, Kalil, Blaustein & Judlowe

[57] ABSTRACT

The invention contemplates an improved mechanical traction drive with a hydraulically implemented single control whereby a desired range of speed ratios between input and output shafts is selectively available, without requiring clutch connection to the power source, such as a battery-operated electric motor. The transmission employs a combination of completely mechanical friction-roller and meshing-gear planetary systems which are connected at all times, whether the single control is operated to call for a forward drive or a stop, and whether the motor is run in the direction to produce a forward or a reverse drive of the output shaft. Provision is made for automatically downshifting and upshifting the transmission via hydraulic means, in response to input-torque requirements and/or output-torque limitations.

43 Claims, 8 Drawing Figures

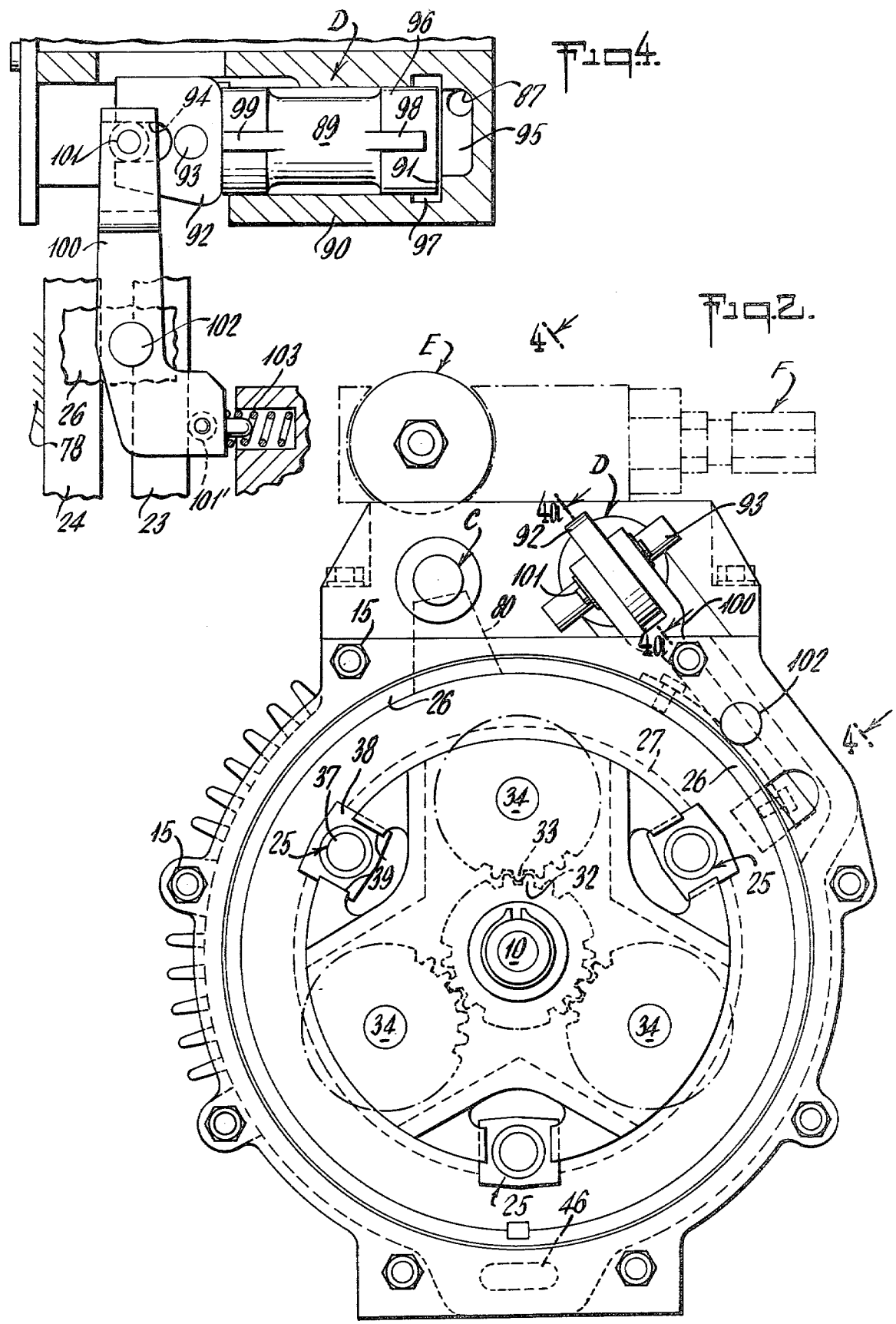

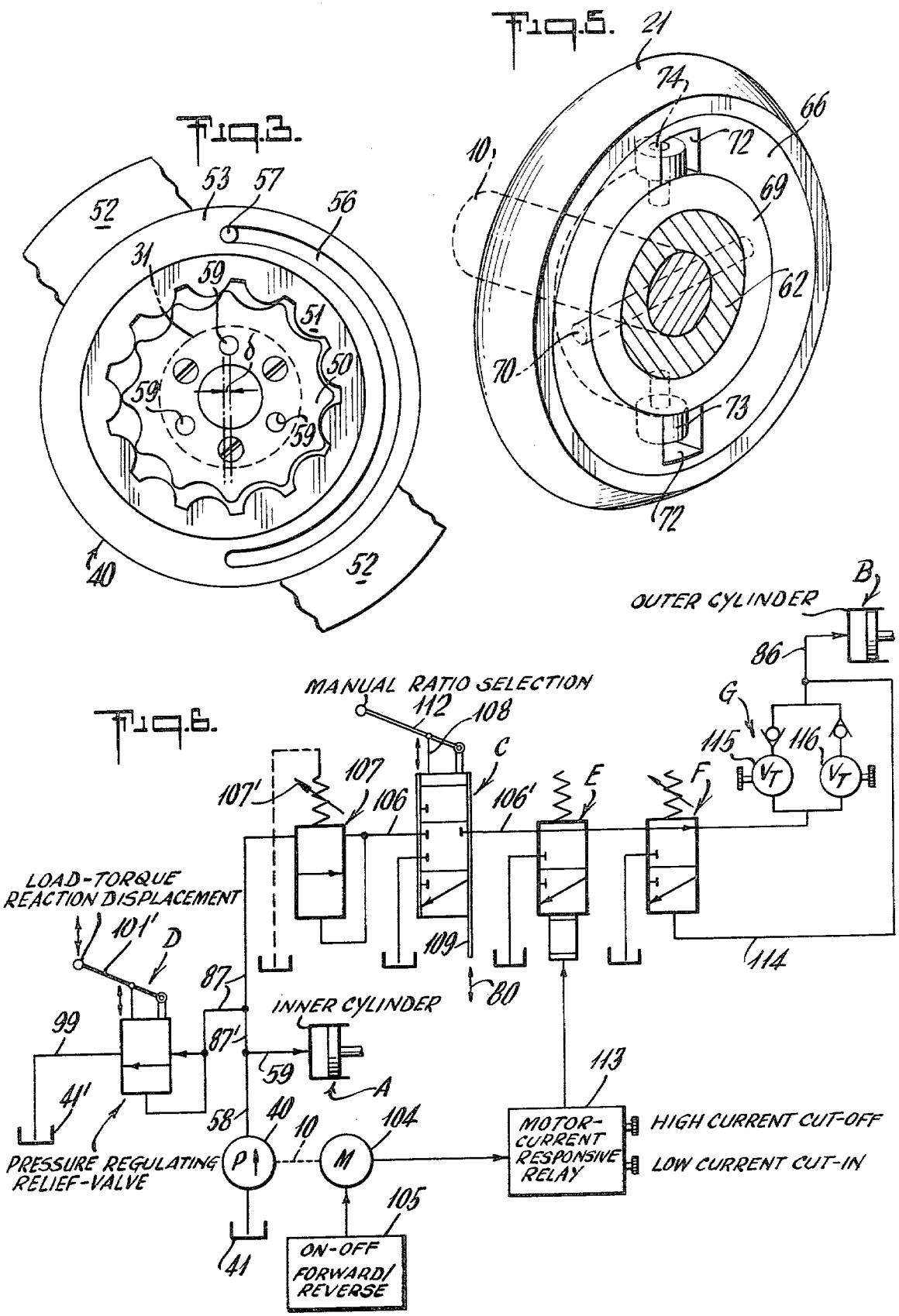

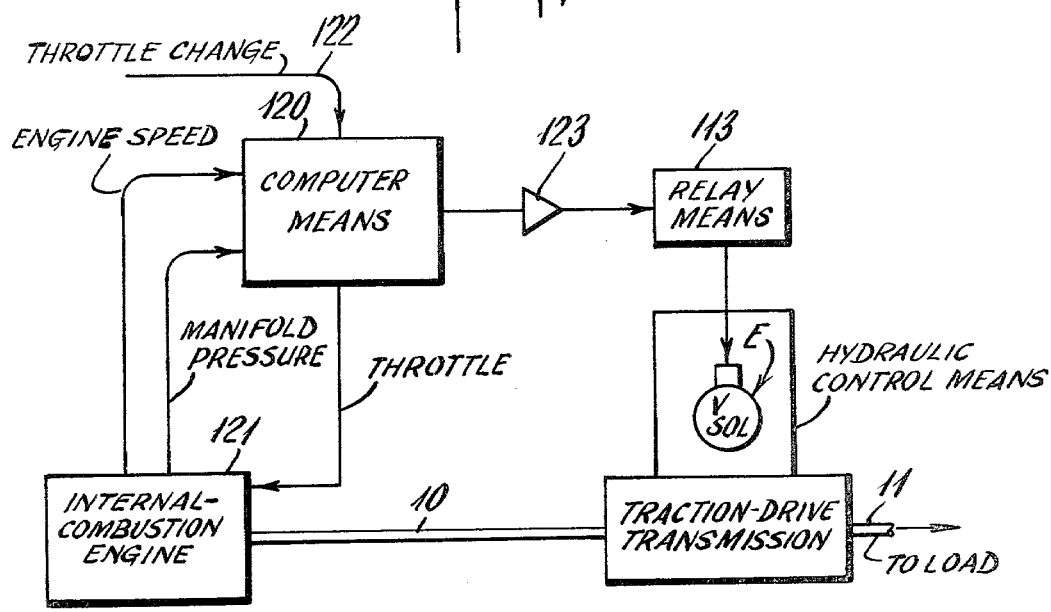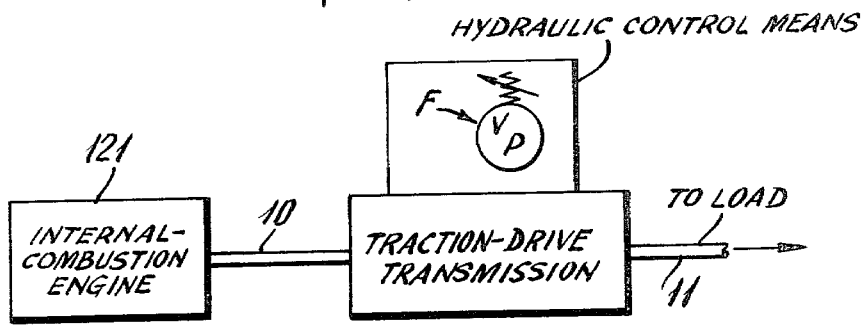

TRACTION-DRIVE TRANSMISSION WITH HYDRAULIC CONTROL

This invention relates to mechanical traction drives and in particular to those involving planetary systems of rolling and gear elements. Purely mechanical versions of such drives are disclosed in U.S. Pat. No. 4,098,145 and in copending applications, Ser. No. 831,934, filed Sept. 9, 1977 (now U.S. Pat. No. 4,185,509) and Ser. No. 920,332, filed June 29, 1978 (now U.S. Pat. No. 4,185,509).

In drives of the character represented by these patent disclosures, an input shaft carries and imparts input torque to a pair of axially movable sun wheels and a sun gear, and a cage which is rotatable about the input shaft maintains the integrity of fixed angular spacing between radially movable planet wheels having rolling contact with the sun wheels and between planet gears meshing with the sun gear; reaction rings surround the planet-roller orbit and are mounted to housing structure via a compliantly yieldable suspension which allows a degree of angular displacement of the reaction rings about the shaft axis in response to reaction torque, output torque to the load being picked off via a ring gear in mesh with the planet gears. The nature of sun-wheel and reaction-ring engagement with the planet rollers involves axially preloaded compliant compression, and orbit speed of the planet rollers will vary in response to relative axial force of sun-wheel engagement vs. reaction-ring engagement with the planet rollers. Reaction-ring displacement in response to load torque is mechanically picked-off and utilized to modify the indicated axial-preload relationship, in the direction to develop automatic downshift of cage or orbit rotation. The purely mechanical nature of these structures renders them sensitive to wear and to mechanical hysteresis, while imposing significant limitations upon the number and nature of control adjustments which can be made with any given mechanism.

It is accordingly an object of the invention to provide an improved transmission of the character indicated, avoiding or significantly reducing difficulties of prior purely mechanical systems.

Another object is to provide hydraulic instrumentalities for the control of such transmissions.

A specific object is to provide a transmission meeting the above objects with hydraulically controlled downshift/upshift, the transmission being adapted for drive by a given prime-mover motor or engine, and the hydraulically controlled shifting being determined by sensed operational characteristics of the prime mover.

It is also a specific object to provide a transmission of the character indicatd with hydraulically operated means for increasing the torque capacity of the transmission as a function of a hydraulically sensed increase in load-torque reaction.

Another specific object is to meet the above objects with a transmission which is self-contained as to all mechanical and hydraulic components thereof.

A further specific object is to meet the above objects with a transmission which requires no external source for the pressure fluid needed for operation of its hydraulic components.

A general object is to meet the above objects with structure of relative mechanical simplicity, low-cost and inherent ease of control and use.

Other objects and various further features of novelty and invention will be pointed out or will occur to those skilled in the art from a reading of the following specification, in conjunction with the accompanying drawings. In said drawings, which show, for illustrative purposes only, a preferred form of the invention:

FIG. 2 is a sectional view taken at the alignment 2—2 of FIG. 1;

FIG. 3 is a sectional view taken at the alignment 3—3 of FIG. 1, to show hydraulic-pump structure contained within the transmission;

FIG. 4 is a fragmentary view of load-torque sensing components of the transmission, the view being taken from the aspect 4—4 of FIG. 2, certain parts being shown in section at the plane 4a—4a of FIG. 2;

FIG. 5 is a fragmentary view in perspective to show keyed sun-wheel connection to the input shaft in FIG. 1, the view being taken as seen from the section plane 5—5 of FIG. 1;

FIG. 6 is a circuit diagram schematically showing the hydraulic system for the case of electric-motor drive of the transmission of FIG. 1; and FIGS. 7 and 8 are simplified diagrams to illustrate different employments of the transmission, driven by an internal-combustion engine.

Figure 1:
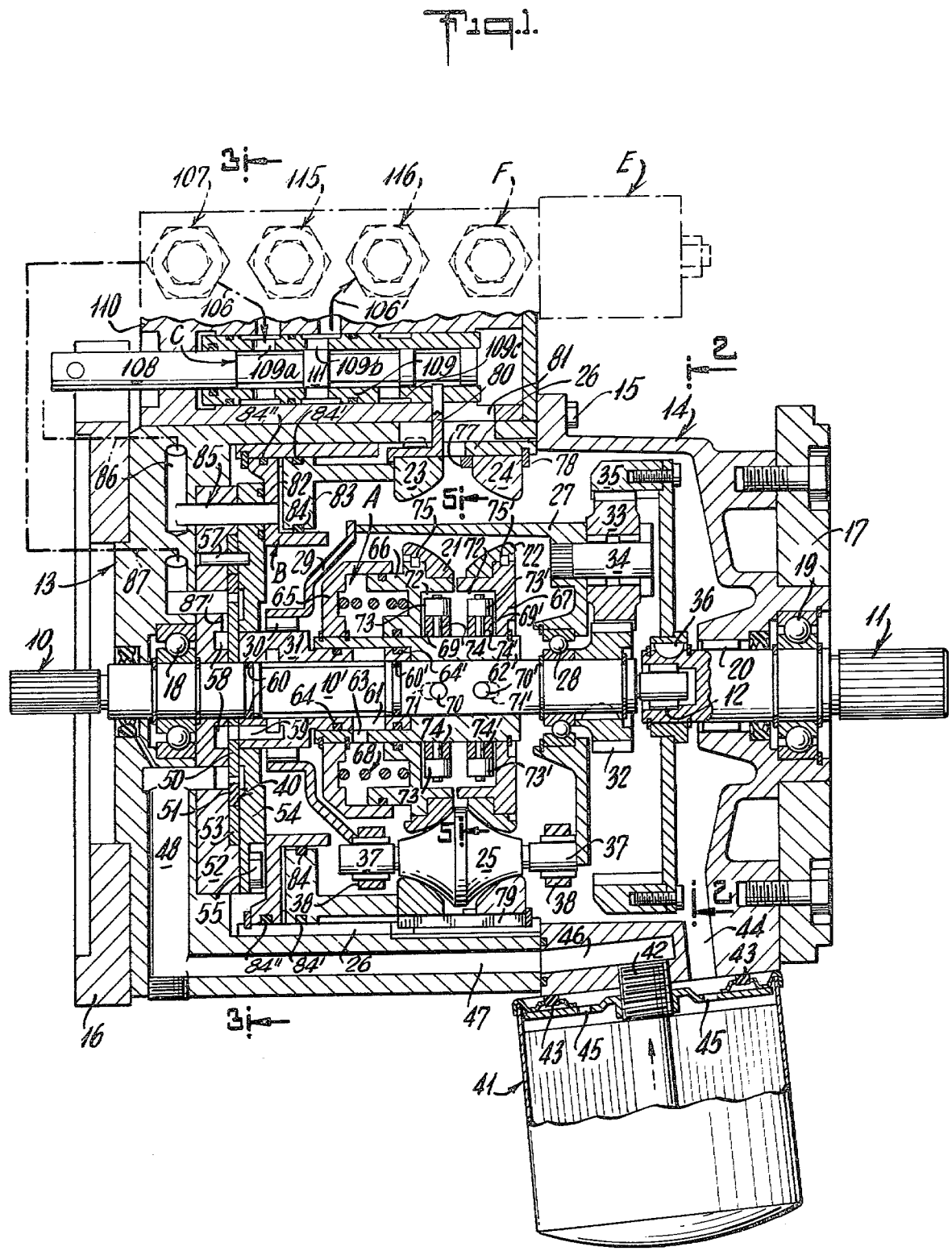
FIG. 1 is a longitudinal sectional view through a traction-driven transmission of the invention.

Briefly stated, the presently illustrated embodiment of the invention contemplates application to a combined planetary-roller and planetary-gear transmission system of the character described in said patent disclosures, except that input-shaft rotation is used to develop within the transmission a source of hydraulic pressure (a) for continuous hydraulic loading of both reaction rings against the planet wheels and (b) for continuous hydraulic loading of both sun wheels against the planet wheels, the arrangement being such that sensed torque is operative to modify the relative magnitude of these hydraulic-loading functions, in the directional sense needed to efficiently accommodate a given input-shaft power source to instantaneous torque demands of a varying load. Various control and selectively adjustable features will be described in connection with FIGS. 1 to 6, in the specific illustrative context of a reversible electric motor as the power source for rotary input to the traction-drive transmission.

In the form shown, the traction drive of the invention provides for front-end power connection to an input shaft 10 and for rear-end connection to a load at an output shaft 11, the shafts 10-11 being on a common axis and having a region of telescoped overlap and mutual aligning support at needle-bearing means 12. Operating mechanical and hydraulic parts of the transmission are contained within and/or carried by generally cylindrical housing structure, comprising a cupped front-end member 13 and a cupped rear-end member 14, secured to each other by spaced bolts 15 at registering flange regions. Accommodation to front and rear mounting structure is suggested at 16-17, respectively. A main front bearing 18 for the input shaft 10 is seated in a suitable bore in the closed end of housing member 13, and a main rear bearing 19 is similarly seated in a bore of housing member 14, the latter being shown with substantial further stabilizing support at a needle bearing 20, closely adjacent the region 12 of aligning support of shafts 10-11.

Two axially opposed sun-wheel rings 21-22 are effectively keyed to rotate with the input shaft 10, and they have limited freedom for relative axial displacement, as will later more clearly appear. Rings 21-22 are inner components of a rolling-contact planetary system which further includes a pair of opposed reaction rings 23-24, and an angularly spaced plurality of planet rollers 25; the contouring and general coaction of these elements 21 to 25 are described in the above-identified patent and patent applications and therefore need not be further described. It suffices to state that reaction rings 23-24 have limited freedom for relative axial movement, being suitably mounted in the bore of a mounting sleeve 26 which surrounds the rolling-contact planetary system, and that the planet rollers 25 rely upon a cage member 27 to maintain their angularly spaced relation and to allow them a limited range of radial-displacement freedom, for adaptation to the axial preload of inner reaction-ring squeezing engagement therewith and of outer sun-wheel engagement therewith.

The cage member 27 includes a rear-end wall having a bore for a rear bearing 28, by which it is mounted for rotation with respect to shaft 10, and the integrity of such support is enhanced by a front-end closure or bell 29 having a hub bore by which front-end bearing support is derived via needle-bearing means 30 riding a sleeve 31, which in turn rides shaft 10 and forms part of the hydraulic system to be described.

The planetary-gear train by which cage rotational torque is delivered to the output shaft 11 comprises a sun gear 32 keyed to the input shaft 10 and meshing with angularly spaced planet gears 33, shown with needle-bearing support on studs 34 fixed to the rear-end wall of cage member 27. In turn, the planet gears 33 mesh with a ring gear 35 having keyed connection at 36 to output shaft 11.

Each planet roller 25 is characterized by axially outwardly opposed concave traction surfaces, which coact with similar but convex and axially inwardly directed traction surfaces of the sun wheels 21-22 and reaction rings 23-24, respectively, the sectional radius of curvature of planet traction surfaces being greater than that of the convex surfaces with which they coact. Each planet roller 25 is shown with oppositely projecting reduced cylindrical ends 37, each of which derives needle-bearing support from a slide block 38 riding its own radial-guide configurations 39 (FIG. 2) forming part of the cage member 27.

In the relationship shown in FIG. 1, the transmission is in "neutral" position, meaning that the cage-driving ratios within the rolling planetary system match those of the planetary gear system, so that no output rotation is imparted to the output shaft, whatever the speed of input-shaft rotation; in this condition, the reaction rings 23-24 are at their greatest separation, the sun wheels 21-22 are at their closest adjacency, and the planet rollers 25 are at their radially outmost position. Forced axial approach of reaction rings 23-24 changes the rolling-contact radii within the rolling planetary system, with accompanying spread of sun wheels 21-22 and radially inward displacement of planetary rollers 25, resulting in increasing cage-rotation speed as a function of input-shaft speed; in this circumstance, the output-input shaft-speed ratio changes to impart rotation to output shaft 11 at a rate which increases as a function of inward displacement of the planetary rollers 25.

As explained in said patent disclosures, the operation of a transmission of the character indicated relies upon the parts running in a traction oil, an acceptable product being the Monsanto Co. synthetic hydrocarbon traction fluid commercially known as SANTOTRAC-50.

The Hydraulic System—Major Components

In accordance with a feature of the invention, the same oil that is used for traction-fluid purposes within the transmission is also used for control and operating purposes. To this end, a circulating hydraulic system including a pump 40 (FIG. 3) is self-contained within the transmission assembly, and a standard automobile cartridge-type oil-filter 41 serves as the sump from which filtered oil is drawn by the pump for such circulation. As shown, cartridge 41 has a central threaded fit at a nipple 42 to the bottom of housing member 14, the same being circumferentially sealed at 43 to define an annular space via which return oil from a passage 44 may enter inlet apertures 45 of the cartridge. The housing members 13-14 have suitably sealed communicating passages 46-47-48 by which filtered oil from the cartridge is made available to pump 40.

The pump 40 is shown to be of the gear-within-gear variety wherein the driven rotor 50 is an inner-gear member having one less tooth than the outer or ring-gear member 51 with which it meshes. The inner-gear member 50 is bolted to sleeve 31 and is effectively keyed to rotate with the input shaft 10, whereas the outer-gear member 51 is effectively journaled for rotation on a fixed axis which is eccentrically offset to the extend $\delta$ from the axis of shaft 10. A first pump-housing plate 52 has a shallow circular bore centered on the shaft axis, for direct piloting rotational support of an eccentric annular shift ring 53 and for indirect piloting rotational support of the outer-gear member 51, the latter deriving its piloting support from the eccentric bore of shift ring 53. A second housing plate 54 secured to plate 52 completes the gear-pump cavity, and the pump housing will be understood to be secured within the end-closure wall of the transmission housing member 13, as suggested by bolt means 55. The shift ring 53 has a semicircular slot 56 which, in conjunction with a pin 57 held by and between the pump-housing plates 52-54, determines angular limits of rotary displacement of the shift ring in response to frictional drag upon rotation of outer-ring gear member 51. Thus, for one direction of input-shaft rotation, the shift ring 53 will be carried to one of its limits of angular displacement (member 51 at $+\delta$ offset), and for the other direction of input-shaft rotation, ring 53 will be carried to the other of its limits of angular displacement (member 51 at $-\delta$ offset). The effecting of such displacements changes the direction of eccentric offset for the center of rotation of outer-gear member 51 and assures desired unidirectional pump action, regardless of the direction of input-shaft rotation. The pump itself is a commercially available product and thus needs no further description; specifically, for a transmission of the invention to handle 15 horsepower, a so-called Gerotor Type 12131 pump of the character indicated (with a rotor width of 0.186 inch) is suitable and will pump oil at 2.8 gallons per minute, for an input-shaft rotation of 3000 rpm; said pump is a product of W. H. Nichols Company, Portland, Maine.

The primary function of pressurized oil delivered by pump 40 is to preload an "inner" annular cylinder A and an outer annular cylinder B, governing squeezing force applied to the sun-wheel system 21-22 and to the reaction-ring system 23-24, respectively, all subject to certain controls which will be later described, particularly in connection with FIG. 6. Pump output is available at a passage defined by an annular groove 58 in the housing plate 52 and is delivered to the inner cylinder A via registering passages 59 (in inner gear 50 and in the sleeve 31 to which it is secured) to an annular manifold groove in sleeve 31, at a necked region 10' between spaced seals 60–60' of shaft 10 to the bore of sleeve 31. Thence, axially elongate angularly spaced radial ports 61 in the reduced end of sleeve 31 deliver pressure fluid to the inner cylinder A.

The inner cylinder A forms an integral part of support structure for the sun wheels 21–22, all of which structure is shown carried upon a sleeve 62 having limited freedom of axial displacement on shaft 10 and having telescoping overlap with the reduced end of sleeve 31. Registering ports 63 in sleeve 62 deliver pressure fluid from ports 61 to the chamber of cylinder A, the fluid communication being assured by spaced seals 64–64'. A flanged annular member 65 secured to the reduced end of sleeve 62 defines the cylinder head and casing per se, and a flanged annular member 66 is not only the piston which coacts with cylinder member 65 but also provides the locating seat for sun wheel 21. A third flanged annular member 67 provides the locating seat for the other sun wheel 22 and is effectively part of the sleeve 62 and cylinder member 65, by reason of snap-ring connections shown. Inner and outer O-ring seals between piston member 66 and members 65–62 complete the piston-cylinder relation at A, and coil-spring means 68 seated in axially facing grooves in members 65–66 assures that sun wheels 21–22 will normally return to their position of closest adjacency, in the absence of hydraulic pressure.

The indicated keyed relation between shaft 10 and the sun wheels is in the form shown accomplished similarly but independently for each of the sun wheels, the keyed connection for the case of sun wheel 21 being shown in greater detail in FIG. 5. The roller-loading axial end of wheel-support member 66 has an enlarged bore which accommodates a torque ring 69, and a pin 70 through shaft 10 and sleeve 62 effectively ties shaft 10 to diametrically opposite locations of the torque ring 69, the aperture 71 for pin passage through sleeve 62 being elongate as shown, to allow for a range of axial displacement of sleeve 62 on shaft 10. And the bore which receives ring 69 has limited radially outward local recesses 72 at diametrically opposed locations which are 90° displaced from the alignment of pin 70. The recesses 72 are characterized by spaced parallel generally radial walls which are also parallel to the axis of shaft 10, and cylindrical rollers 73 mounted to torque ring 69 via needle bearings and radial pins 74 engage one or the other of the spaced parallel recess walls, depending upon the instantaneous direction of torque transmission from shaft 10 to the sun wheel 21. Finally, it will be understood that the keyed relation is completed, between annular support member 67 and sun wheel 21, by suitable means, suggested at 75.

The indicated keyed relation of shaft 10 to sun wheel 21 via pin 70 will be understood to be substantially the same as an independent keyed connection of shaft 10 to the other sun wheel 21, via a second such pin 70'. For this reason, primed notation is adopted for identification of those drive parts to sun wheel 22 which correspond to what has already been described in connection with sun wheel 21. Of course, for sun wheel 22, each of the rollers 73' engages one of the parallel walls of one of the keying recesses 72' in the wheel-support member 67.

It is thus seen that the sun wheels 21–22 are pushed apart only via radially inward displacement of the planet rollers 25. Such separating displacement of the sun wheels is opposed by the constant combined pre-load force of spring means 68 and of pumped pressure fluid acting upon the inner cylinder A. And the elongate pin slots 71–71' enable sleeve 62 to freely assume an axial position in which both sun wheels 21–22 equally and symmetrically share their resistance to forced inward displacement of the planet rollers 25. In the course of any axial repositioning displacement of sleeve 62, frictional drag is reduced to a minimum by reason of the antifriction mounting of the torque-transmission rollers 73–73'.

The outer cylinder B is carried by and within the sleeve 26 which mounts the reaction rings 23–24, the right-hand ring 24 being shown axially retained against snap-ring means 78; a spacer ring 77 limits squeezed approach of ring 23 to ring 24. Both rings 23–24 are keyed at 79 to sleeve 26, and a finger bracket 80 carried by ring 23 extends through a local longitudinal slot 81 in sleeve 26, for a ratio-control function to be later explained, in connection with a selectively operable valve C for determining a selected transmission-ratio operational base. A first flanged annular member 82 defines with sleeve 26 the casing for cylinder B and will be understood to be axially positioned by the end face of rear housing member 14 and by the pump housing plate 54; and a second flanged annular member 83 is the coacting piston, being axially movable between concentric cylinder walls provided by members 26–82. The flange of member 83 extends axially into circumferentially continuous axially thrusting contact with ring 23, the movable reaction ring. O-ring seals 84–84'–84" serve the action of cylinder B, and aligned ports designated 85 admit actuating pressure fluid from a low-pressure supply line 86 to cylinder B. Fluid pressure in line 86 is the functional product of various control elements to be later described, primarily in connection with FIG. 5, all served via a control-pressure line 87 (and via a connecting groove 87') from the high-pressure outlet manifold 58 of the pump 40.

In accordance with a further feature of the invention, means are provided for hydraulically sensing load-torque reaction and for utilizing this torque reaction to set system pressure and thus preload the cylinders A and B in the roller-squeezing direction. This hydraulic sensing means is in the form shown a relief valve D (FIGS. 2 and 4) which normally functions to divert to the sump such a controlled flow of high-pressure fluid in line 87 as will develop a minimum high pressure (i.e., less than maximum high pressure) in the actuating line 59 to the inner cylinder A; upon detection of load-reaction torque, the valve D is actuated in the closing direction to restrict the flow to sump and therefore to raise the high-pressure level, thus increasing squeezing action on the planet wheels 25, and therefore increasing torque capacity of the roller planetary system.

More specifically, and in reference to FIGS. 2 and 4, the relief valve D is shown to comprise a spool member 89 axially displaceable in the cylindrical bore of its casing 90, between an annular head-end seat 91 and the position in which it appears in FIG. 4, in abutment with the flat base end of an actuating cam or wobble plate 92. Plate 92 is pinned at 93 to the casing and is characterized by forked projections defining an actuating slot 94. High-pressure fluid from line 87 enters a chamber 95 at the head end of the case, above the head land 96 of spool member 89; in the normally open condition shown in FIG. 4, a pressure-reducing flow of oil passes between the end face of land 96 and the seat 91, to a circumferential groove 97 which laps one or more longitudinal grooves 98 communicating with the neck region of spool 89 and thence to sump via grooves, as at 99, which discharge to the mechanically operative interior region of the transmission housing. Valve D is actuated by a drag link 100 having a pinned-clevis engagement 101 to the actuation slot 94 of plate 92 and having a ball-and-socket universal connection 102 to the reaction-ring mounting sleeve 26, the sense of this connection being to tangentially pick-off via link 100 a force to actuate the wobble plate 92 and thus to displace spool 89 in the direction of its seat, all in response to such load-torque reaction as will impart incremental rotary displacement to the mounting sleeve 26. As shown, link 100 is a bell crank with a tail end spring-urged at 103 to assure tracking abutment of a follower pin or lug 101' with the movable reaction ring 23.

It is an important feature that movement of clevis pin 101 in the radial slot 94 changes the mechanical advantage with which sensed torque reaction (tangential force via drag link 100) is converted into a closer-seating displacement of spool member 89, with accompanying elevation of "high" pressure in line 87; the changed mechanical advantage reflects bell crank (100) rotation by reason of positional tracking of the axial position of reaction ring 23, in the sense that control pressure in line 87 is caused to increase at a faster rate (in response to a given level of sensed reaction torque) the lower the transmission ratio, i.e., the greater the axial spread between reaction rings 23-24.

The Hydraulic System—Control Components

Referring additionally to Fig. 6, those major components which have already been identified will be recognized in a particular control circuit, designed for automatic downshift/upshift regulation of output-shaft rotation under varying load conditions, in such single-direction speed as may be achievable for a given selectively adjusted transmission-ratio setting of valve C. The circuit will be described for prime-mover drive by an electric motor 104 having suitable provision for ON/-OFF and FORWARD/REVERSE selective control, designated generally at 105.

Motor 104 is shown connected by shaft 10 to drive pump 40, which will supply pressure fluid to lines 87 and 59, at a nominal level (e.g., 20 psi) determined by the pressure-regulating function of relief valve D, as when spool 89 is in its described maximum-open position. In FIG. 6, the described load-torque reaction linkage to actuate valve D is symbolized by a crank 101', and the relieving flow to sump is symbolized at 41', via passage 99. Normally, therefore, and in the absence of load-torque reaction sufficient to achieve any spool-displacement of valve D in the closing direction, the fluid-pressure level supplied to the inner cylinder A will be at the indicated nominal level. However, any load-torque reaction which begins to move spool 89 in the closing direction will entail a rise in fluid pressure at the inner cylinder A; and to provide an indication of possible pressure rise, we observe that the pump 40 (as above identified) has the inherent capability of delivering pressure fluid at, say, 500 psi.

In the circuit of FIG. 6, controlled delivery of pressure fluid to the outer cylinder B is via lower-limited pressure line from a suitable pressure-limiting valve 107, supplied by the high-pressure line 87, and adjustably set to bleed fluid flow to sump if necessary to assure, say, an 80 psi limit of supply in line 106 to valve C and cylinder B, adjustability being suggested at means 107' associated with valve 107. The line 106 is shown serially connecting the ratio-selection valve C, a solenoid-operated normally-open valve E, a pressure-operated normally-open valve F, and a directionally throttling check-valve network G, all to the outer cylinder B.

As shown in FIG. 1, the ratio-selection valve C comprises an actuating spool member 108 which, in conjunction with a feedback sleeve 109 (constantly tracking the axial position of reaction ring 23, via finger bracket 80), provides one of three phases of fluid-flow control, namely: (1) no flow at all, for the central position shown, (2) positive forward flow (supplying flow to cylinder B), for a displacement to the right, in the sense of FIG. 1, and (3) backward pressure-relieving flow to sump, for a displacement to the left, in the sense of FIG. 1. More specifically, the feedback sleeve 109 is slidable in the cylindrical bore of the body 110 of valve C; sleeve 109 provides two axially spaced sets of ports 109a-109b which respectively communicate (a) with the low-pressure supply connection 106 from reducing valve 107, and (b) with the connection 106' to further series-connected elements serving the outer cylinder B. And the spool member 108 is characterized by elongate neck regions on opposite axial sides of a central land 111 which laps the full extent of ports 109b whenever an equilibrium condition is achieved for cylinder B displacement, meaning no further flow is then needed to output connection 106'. A rightward displacement of spool member 108 with respect to sleeve 109 immediately opens the supply of low-pressure fluid from line 106 to line 106', causing a rightward displacement of the piston 83 of cylinder B, thus upshifting the transmission; the upshifting will continue until the feedback sleeve 109 (which constantly tracks the axial position of reaction ring 23) has been displaced enough to cause port 109b to be fully lapped by land 111, at which time an equilibrium (i.e., no fluid flow in line 106) condition of transmission upshift will have been achieved. A leftward displacement of spool member 108 from any given equilibrium relation (i.e., from a no fluid-flow condition in line 106) will open port 109b to a sump-connecting port 109c, thereby releasing pressure fluid from cylinder B, and allowing reaction ring 23 to move to the left (in the transmission-downshifting direction), until leftward displacement of the feedback sleeve 109 stops the further release of pressure fluid by returning to the equilibrium condition in which port 109b fully laps the central land 111.

Before leaving the description of valve C, it should be noted that the foregoing upshifting and downshifting functions follow from simple axially adjusted positioning of the control-spool member 108, as by setting a control lever, suggested at 112 in FIG. 6. There is never any noticeable force resisting such adjustment, beyond the low friction inherent in seal action attendant the various O-ring engagements shown. The finger bracket 80 has substantial two-way lost motion prior to any possible engagement with spool member 108, and no such engagement can occur in the normal feedback-controlled upshift or downshift displacements of the hydraulic control means. The only utility for the described lost-motion relation of finger 89 to spool member 108 is the retention of parts at all times.

The remaining elements E-F-G of the control circuit of FIG. 6 are illustrative of safety and adjustment features in application to the basic circuit already described. For example, for the preferred motor-circuit control of transmission ratio, the solenoid valve E, in its normal condition shown, freely passes control fluid to or from cylinder B; but in the presence of a predetermined upper threshold level of motor current, sensed at suitably responsive relay means 113, the solenoid of valve E is actuated to discharge line 106' to sump, thus relieving hydraulic force upon cylinder B and allowing the mechanical system to downshift, whereby the load on the motor is reduced. Legends applied to separate selectively adjustable knobs associated with relay means 113 suggest (a) provision for a detected high-current threshold level at which valve E will be displaced to discharge fluid to sump ("cut-off"), and (b) provision for a detected low-current threshold level at which valve E will be displaced back to its normal position shown ("cut-in").

For the preferred motor-current control of transmission ratio via valve E, the valve F is a further safety valve which may be functionally identical to the valve E, except that it is pressure-operated. Its constants will be understood to be selected such that when pressure delivered to cylinder B reaches a predetermined upper limit of safety, as sampled in a line 114, the normally open condition of valve F is changed for sump-discharge of pressure fluid delivered to cylinder B. And of course when a predetermined lower level of pressure is thereafter sensed via line 114, the operation of valve F will be understood to return the line 106' to an open condition of ability to supply operating pressure to cylinder B.

The network G will be seen to comprise two parallel arms, each of which contains a check valve, the check valves being directionally opposite in action. A first selectively variable throttling valve 115 in one of these arms is determinative of a first predetermined flow rate to cylinder B, and a second such valve 116 in the other arm is determinative of a second predetermined displacement-relieving flow rate from cylinder B. It will be understood that valves 115-116 are set to provide a damping function to set the rate of up or downshift action, as may most appropriate for particular application requirements.

The described control system will be seen to respond with equal facility either to a manually selected upshifting or downshifting adjusted position of the ratio-control means C (at 108), or to a detected motor-load condition as sensed by relay means 113, operative upon solenoid valve E. Should load-reaction torque manifest itself to the extent of applying enough tangential force via link 100 and wobble plate 92 to displace member 89 of valve D, the flow-dumping function of valve D will be reduced, and control pressure in line 87 will become correspondingly elevated, e.g., above the nominal 20 psi minimum level which has been mentioned. As long as the thus-elevated pressure in line 87 remains within the 80 psi limiting level described in connection with valve 107, both the inner and the outer cylinders A-B will be subjected to corresponding increases in pressure, meaning that there will be greater squeeze of the planet rollers, applied by both the sun wheels and the reaction rings, thus elevating the torque capacity of the transmission without upsetting the ratio setting involved in the described function of valve C. In fact, it is found that valve C, being a servo valve slaved to the selected setting of its spool member 108 is able to utilize its supply of 80 psi-limited pressure fluid for stabilized maintenance of a selected transmission ratio, even in the circumstance of substantial elevation of control-fluid pressure in line 87, well above the illustrative limiting 80-psi level set at 107.

While the invention has been described for a single preferred embodiment, it will be understood that modifications may be made without departing from the claimed scope of the invention. For example, since the described embodiment uses a reversible electric motor as the prime mover, there is no need to design inherent reversibility in the range of transmission ratios available from the cooperative action of the traction-rolling and meshing-gear planetary systems, i.e., zero output-shaft (11) speed for the most downshifted condition (shown in FIG. 1, with sun wheels 21-22 in their condition of closest approach). Conversely, for planetary systems designed to provide a range of "forward" and "reverse" ratios of input-to-output shaft rotation, there is no need for prime-mover reversability—i.e., a single-direction prime mover, such as an internal-combustion engine, will suffice. And the described automatic and selectively variable functions of the hydraulic system will be equally applicable.

While our preference has been indicated for motor-current control of downshifting, via valve E, and utilizing valve F only as a safety response to a predetermined excess of pressure at cylinder B, it will be seen that the functions of these valves (E-F) can be reversed, upon suitable adjustment of the thresholds at 113 and at valve F. For example, if valve F is set to operate at a cylinder-B pressure level less than will account for motor current reaching the high-current threshold at 113, then a predetermined elevated pressure at B (e.g., 75 psi) may cause valve F to dump cylinder-B fluid to sump, thus enabling an automatic down-shift of the transmission, i.e., below the ratio called for by the setting of spool member 108.

FIGS. 7 and 8 provide two illustrations of the transmission of the invention in application to an internal-combustion engine as the prime mover, connected to drive the shaft 10. In the arrangement of FIG. 7, computer means such as a suitably programmed microprocessor 120 is connected to receive various parameter inputs from an internal combustion engine 121, the parameter inputs being shown illustratively as manifold pressure and engine speed, for a given throttle-setting input control at 122. Computer 120 determines optimum engine operation and senses whether engine 121 is being overloaded for its driven condition, the sensed output of the computer being supplied to suitable amplifier or signal-processing means 123 for supply to relay 113, and thus governing downshift/upshift control of the transmission via valve E, as already described for the electric-motor driven situation.

In FIG. 8, the internal-combustion engine 121 is shown merely driving the transmission, i.e. having no direct automatic control of transmission ratio, the automatic downshift (upshift) function of sensed overload (relieved overload) being relegated to the pressure-responsive valve F, adjustably set as already described in connection with alternative operation of the electric-motor driven combination of FIG. 6.

Regardless of the control configuration for operation of our transmission, it will be seen that the radial clearances needed for accommodation of smooth axially sliding displacement of sun rings 21-22 (with respect to shaft 10) and of reaction rings 23-24 (with respect to sleeve 26) enable the rolling planetary system to adapt itself to the precise centers of rotation needed for dynamically balanced operation of the planetary elements, whatever the selected ratio relationship. This limited freedom also means freedom for rings 21-22-23 to axially determine their optimum positions, in reference to the axially fixed reaction ring 24. A concomitant beneficial result is that the adjacent radially clearing surfaces which accommodate axial freedom of displacement need not be the subject of such strict manufacturing tolerances as would unduly elevate manufacturing cost.

What is claimed is:

1. A transmission comprising a housing, a drive shaft and a driven shaft journaled for rotation in said housing on a common axis, a variable-ratio coupling mechanism coupling said shafts, pressure-fluid operated control means for vaying the instantaneous coupling ratio of said mechanism, said mechanism having yieldable antirotational support in said housing, said control means including means operative in the presence of rotational displacement of said mechanism with respect to said housing in response to a change in torsional load on said mechanism, said control means being operatively connected to effectively increase the torque capacity of said coupling mechanism in response to increasing torsional load for a given ratio of said coupling mechanism.

2. The transmission of claim 1, wherein said pressure-fluid means includes a pressure-fluid source comprising a pump contained within said housing and having driven connection to aid input shaft.

3. The transmission of claim 1, wherein said variable-ratio coupling mechanism includes a movable element the position of which reflects instantaneous coupling ratio, and means responsive to a positional change of said movable element for modifying the increase in torque capacity in response to increasing torsional load for the changed ratio reflected by said positional change.

4. The transmission of claim 1, wherein said variable-ratio coupling mechanism is of the pressure-operated rolling-element variety relying on pressure-operated clamping force upon rolling elements, said control means being operative to increase clamping pressure in response to increasing torsional load.

5. The transmission of claim 1, wherein said variable-ratio coupling mechanism includes a movable element the position of which reflects instantaneous coupling ratio, and means responsive to a positional change of said movable element for changing the rate of increase of clamping pressure in response to increasing torsional load, said changed rate being in the directional sense to increase said rate in the direction of lower-ratio change.

6. The transmission of claim 1, wherein said control means is operatively connected to effectively downshift said coupling mechanism in response to increasing torsional load.

7. The transmission of claim 6, in which said control means is also operatively connected to up-shift said coupling mechanism in response to decreasing torsional load.

8. The transmission of claim 7, in which said control means includes a selectively positionable control member for determining a selected upper limit of the coupling ratio of said mechanism, whereby automatic downshifting will only occur for torsional-load conditions exceeding the capacity inherently applicable to the selected position of said control member, and whereby automatic up-shifting will only occur upon subsequent reduction in torsional-load conditions.

9. The transmission of claim 2, wherein said variable-ratio coupling mechanism includes rolling-contact traction-drive elements adapted to run in a traction-fluid environment, said pump having an inlet positioned to admit traction fluid from said environment for supply as pressure fluid in said control means.

10. The transmission of claim 9, wherein said pump is of the variety adapted to admit traction fluid at said inlet and to supply pressure fluid in said control means regardless of the direction of input-shaft rotation, whereby said transmission is operative regardless of the direction of input-shaft rotation.

11. The transmission of claim 9, wherein said pressure-fluid control means includes a pressure-fluid discharge means adapted to discharge control fluid into said environment.

12. The transmission of claim 2, in which said pump is of the gear-within-gear variety.

13. The transmission of claim 4, including a pump source contained within said housing and having driven connection to said input shaft, said pump source having a pressure-fluid outlet connection to said control means, said last-mentioned connection including pressure-relieving valve means having a normal setting for maximum pressure-relieving flow to assure a minimum application of said pressure-operated clamping force, said means operative in the presence of said rotational displacement being so connected to said valve means as to change the setting thereof in the direction of reducing its pressure-relieving flow to thereby increase the application of said force above said minimum.

14. A transmission comprising a housing, a drive shaft and a driven shaft journaled for rotation in said housing on a common axis, a variable-ratio coupling mechanism coupling said shafts, pressure-fluid operated control means for varying the instantaneous coupling ratio of said mechanism, said mechanism having yieldable antirotational support in said housing, said control means including means operative in the presence of rotational displacement of said mechanism with respect to said housing in response to a change in torsional load on said mechanism, said control means being operatively connected to effectively downshift said coupling mechanism in response to increasing torsional load.

15. A traction-drive transmission, comprising a housing, a drive shaft journaled for rotation in said housing, a pair of spaced sun rings having keyed longitudinally relatively slidable support on said shaft, first fluid-pressure operated actuator means connected to axially load said sun rings in the direction of relative approach to each other, plural like planet wheels axially interposed between and in rolling contact with said sun rings, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, a pair of axially relatively movable reaction rings having antirotational support in said housing and in constant rolling contact with said planet wheels, second fluid-pressure operated actuator means connected to axially load said reaction rings in the direction of relative approach to each other, output-drive means connected to said carrier and responsive to carrier rotation about said axis, and force-developing load-torque sensing means including fluid-pressure control means connected to at least one of said actuator means for increasing the fluid-pressure load thereon in response to an increase in sensed load torque.

16. The transmission of claim 15, in which said output-drive means comprises a sun gear keyed to said shaft, a ring gear journaled for rotation on the axis of said shaft, and plural planet gears meshing with said sun and ring gears and journaled on angularly spaced axes in said carrier.

17. The transmission of claim 15, in which said fluid-pressure control means is operatively connected to both said actuators for increasing the fluid-pressure load thereon and hence the torque capacity of said transmission in response to a sensed increase in load torque.

18. The transmission of claim 17, in which shifting means is operatively associated with one of said pairs of rings for controlling the axial spacing thereof and hence the shifted radial positioning of said planet wheels to thereby determine a shifted transmission ratio, said operative connection responsive to a sensed increase in load torque including variable force-amplifying means, said force-amplifying means including a control element tracking the instantaneous axial position of at least one of said rings and being operative to vary the mechanical advantage of force derived from sensed load torque, the variation being in the sense of increasing mechanical advantage in the direction of lowered transmission ratio.

19. The transmission of claim 15, wherein means including a selectively positionable control member is provided to select a predetermined spacing of said reaction rings, and fluid-pressure operated servo-valve means responsive to a selected position of said control member in relation to the instantaneous spacing of said reaction rings for controlling pressure delivered to said second fluid-pressure operated actuator means.

20. The transmission of claim 19, in which one of said reaction rings is axially fixed and said servo-valve means includes a movable element in axially-tracking relation with the instantaneous axial position of the other of said reaction rings.

21. The transmission of claim 15, in which said second actuator means comprises an annular cylinder about the drive-shaft axis and an annular piston axially movable therein, the effective radial extent of said piston and cylinder being substantially that of said reaction rings.

22. The transmission of claim 15, in which said first actuator means comprises an annular cylinder about the drive-shaft axis and an annular piston axially movable therein, the effective radial extent of said piston and cylinder being substantially that of said sun wheels.

23. The transmission of claim 22, in which said piston is fixedly related to one of said sun wheels and said cylinder includes a sleeve-like inner wall upon which said piston is slidable and which projects axially beyond said one sun wheel and is fixedly related to the other of said sun wheels.

24. The transmission of claim 22, in which said piston and cylinder and sun wheels are axially movable as a unit along a part of said drive shaft, said drive shaft having an internal pressure-fluid conduit with a port connection to said cylinder over the effective axially movable extent of said unit.

25. A traction-drive transmission, comprising a housing, a drive shaft journaled for rotation in said housing, two spaced sun wheels having keyed longitudinally relatively slidable support on said shaft, first fluid-pressure operated actuator means connected to axially load said sun wheels in the direction of relative approach to each other, plural like planet wheels axially interposed between and in rolling contact with said sun wheels, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, two reaction rings having antirotational support in said housing and in constant rolling contact with said planet wheels, said antirotational support including an annular member within which said reaction rings are keyed and longitudinally relatively slidable, second fluid-pressure operated actuator means connected to axially load said reaction rings in the direction of relative approach to each other, output-drive means connected to said carrier and responsive to carrier rotation about said axis, and load-torque sensing means including fluid-pressure control means connected to said actuator means for increasing the fluid-pressure load thereon in response to an increase in sensed load torque, said load-torque sensing means further including link means pivotally carried by said annular member and a pressure-control actuator pivotally mounted to said housing and connected to said link means for varying the level of fluid pressure loading both said fluid-pressure operated actuator means.

26. The transmission of claim 25, in which said link means has a slidably guided connection to said pivotally mounted actuator, the axis of slidable guidance being generally radial of the actuator-pivot axis, and in which said link means includes an element tracking reaction-ring axial displacement to thereby determine a pivoted orientation of said link means as a function of transmission ratio, whereby the radius of link connection to said pivoted actuator is also a function of transmission ratio, the radius of slidable connection reducing in the direction of reducing transmission ratio.

27. The transmission of claim 26, in which the axis of slidable guidance is substantially parallel to the shaft axis for a no-load condition, whereby said torque-sensing means is substantially equally effective to increase fluid-pressure load on said actuator means regardless of the direction of rotation of said drive shaft.

28. A traction-drive transmission, comprising a housing, a drive shaft journaled for rotation in said housing, two spaced sun wheels having keyed longitudinally relatively slidable support on said shaft, first fluid-pressure operated actuator means connected to axially load said sun wheels in the direction of relative approach to each other, plural like planet wheels axially interposed between and in rolling contact with said sun wheels, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, two reaction rings having antirotational support in said housing and in constant rolling contact with said planet wheels, said antirotational support including an annular member within which said reaction rings are keyed and longitudinally relatively slidable, second fluid-pressure operated actuator means connected to axially load said reaction rings in the direction of relative approach to each other, output-drive means connected to said carrier and responsive to carrier rotation about said axis, and load-torque sensing means including fluid-pressure control means connected to said actuator means for increasing the fluid-pressure load thereon in response to an increase in sensed load torque, said sun wheels having radial clearance with respect to said drive shaft, whereby a degree of radial-positioning freedom exists for planet-wheel determination of the instantaneous centers of said sun wheels.

29. A traction-drive transmission, comprising a housing, a drive shaft journaled for rotation in said housing, two spaced sun wheels having keyed longitudinally relatively slidable support on said shaft, first fluid-pressure operated actuator means connected to axially load said sun wheels in the direction of relative approach to each other, plural like planet wheels axially interposed between and in rolling contact with said sun wheels, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, two reaction rings having antirotational support in said housing and in constant rolling contact with said planet wheels, said antirotational support including an annular member within which said reaction rings are keyed and longitudinally relatively slidable, second fluid-pressure operated actuator means connected to axially load said reaction rings in the direction of relative approach to each other, output-drive means connected to said carrier and responsive to carrier rotation about said axis, and load-torque sensing means including fluid-pressure control means connected to said actuator means for increasing the fluid-pressure load thereon in response to an increase in sensed load torque, said reaction rings having radial clearance with said annular member, whereby a degree of radial-positioning freedom exists for planet-wheel determination of the instantaneous centers of said reaction rings.

30. A traction-drive transmission, comprising a housing, a drive shaft journaled for rotation in said housing, two spaced sun wheels having keyed longitudinally relatively slidable support on said shaft, first fluid-pressure operated actuator means connected to axially load said sun wheels in the direction of relative approach to each other, plural like planet wheels axially interposed between and in rolling contact with said sun wheels, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, two reaction rings having antirotational support in said housing and in constant rolling contact with said planet wheels, said antirotational support including an annular member within which said reaction rings are keyed and longitudinally relatively slidable, second fluid-pressure operated actuator means connected to axially load said reaction rings in the direction of relative approach to each other, output-drive means connected to said carrier and responsive to carrier rotation about said axis, and load-torque sensing means including fluid-pressure control means connected to said actuator means for increasing the fluid-pressure load thereon in response to an increase in sensed load torque, said fluid-pressure control means comprising a valve block removably secured to and forming part of said housing, said load-torque sensing means including a valve member in said block, and drive-ratio control means including a servo-valve member in said block and controlling the pressure of fluid supplied to said second fluid-pressure operated means.

31. The transmission of claim 30, in which fluid-communicating passage means connects said valve members to said second fluid-pressure operated means, said passage means comprising first and second parallel-related lines in said block, each of said lines including a check valve and a flow-restriction member, said check valves being installed to determine a first direction of flow in one line and the opposite direction of flow in the other line, and said flow-restriction members determining different flow rates, whereby response to an increase in pressure to said first fluid-pressure operated means is different from response thereof to a decrease in pressure.

32. The transmission of claim 31, in which said flow-restriction members are throttling valves.

33. A traction-drive transmission, comprising a housing, a drive shaft journaled for rotation in said housing, two spaced sun wheels having keyed longitudinally relatively slidable support on said shaft, first fluid-pressure operated actuator means connected to axially load said sun wheels in the direction of relative approach to each other, plural like planet wheels axially interposed between and in rolling contact with said sun wheels, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, two reaction rings having antirotational support in said housing and in constant rolling contact with said planet wheels, said antirotational support including an annular member within which said reaction rings are keyed and longitudinally relatively slidable, second fluid-pressure operated actuator means connected to axially load said reaction rings in the direction of relative approach to each other, output-drive means connected to said carrier and responsive to carrier rotation about said axis, said output-drive means including an output shaft with a reduction-gear connection to said carrier, means preloading said sun wheels in the direction of their approach and to an abutment-limited relation wherein said reduction-gear connection establishes a zero-speed output of said transmission, and hydraulic-pump means carried by said housing and connected to supply pressure fluid to said actuators regardless of the direction of drive-shaft rotation, whereby said transmission will equally well serve in either of the selected directions of drive of a reversible electric motor connected to said drive shaft.

34. A traction-drive transmission, comprising a housing, a drive shaft journaled for rotation in said housing, two spaced sun wheels having keyed longitudinally relatively slidable support on said shaft, first fluid-pressure operated actuator means connected to axially load said sun wheels in the direction of relative approach to each other, plural like planet wheels axially interposed between and in rolling contact with said sun wheels, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, two reaction rings having antirotational support in said housing and in constant rolling contact with said planet wheels, said antirotational support including an annular member within which said reaction rings are keyed and longitudinally relatively slidable, second fluid-pressure operated actuator means connected to axially load said reaction rings in the direction of relative approach to each other, output-drive means connected to said carrier and responsive to carrier rotation about said axis, said output-drive means including an output shaft with a reduction-gear connection to said carrier, means preloading said sun wheels in the direction of their approach to an abutment-limited relation wherein for a single direction of drive-shaft rotation said reduction-gear connection establishes a range of forward and reverse drives of said output shaft for sun wheel spreads away from said abutment-limited relation, whereby forward and reverse drive of said output shaft is realizable for a single-direction drive of said drive shaft.

35. A traction-drive transmission, comprising a housing, a drive shaft journaled for rotation in said housing, two spaced sun wheels having keyed longitudinally relatively slidable support on said shaft, first fluid-pressure operated actuator means connected to axially load said sun wheels in the direction of relative approach to each other, plural like planet wheels axially interposed between and in rolling contact with said sun wheels, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, two reaction rings having antirotational support in said housing and in constant rolling contact with said planet wheels, said antirotational support including an annular member within which said reaction rings are keyed and longitudinally relatively slidable, second fluid-pressure operated actuator means connected to axially load said reaction rings in the direction of relative approach to each other, output-drive means connected to said carrier and responsive to carrier rotation about said axis, said output-drive means including an output shaft with a reduction-gear connection to said carrier, means preloading said sun wheels in the direction of their approach and to an abutment-limited relation wherein said reduction-gear connection establishes a zero-speed output of said transmission, and hydraulic-pump means carried by said housing and connected to supply pressure fluid to said actuators, the connection from said pump means to said second fluid-pressure operated means including solenoid-operated valve means having a member which in one position will pass pressure fluid from said pump means to said second fluid-pressure operated means and a second position which is operative to discharge pressure fluid from said second fluid-pressure operated means, an electric motor connected to drive said drive shaft, and solenoid-valve operating means responsive to a predetermined upper threshold of motor current for shifting said valve means from said first to said second position.

36. The transmission of claim 35, in which said last-defined means is further responsive to a predetermined minimum threshold of motor current for shifting said valve means from said second to said first position.

37. A traction-drive transmission, comprising a housing, a drive shaft journaled for rotation in said housing, two spaced sun wheels having keyed longitudinally relatively slidable support on said shaft, first fluid-pressure operated actuator means connected to axially load said sun wheels in the direction of relative approach to each other, plural like planet wheels axially interposed between and in rolling contact with said sun wheels, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, two reaction rings having antirotational support in said housing and in constant rolling contact with said planet wheels, said antirotational support including an annular member within which said reaction rings are keyed and longitudinally relatively slidable, second fluid-pressure operated actuator means connected to axially load said reaction ring in the direction of relative approach to each other, output-drive means connected to said carrier and responsive to carrier rotation about said axis, said output-drive means including an output shaft with a reduction-gear connection to said carrier, means preloading said sun wheels in the direction of their approach and to an abutment-limited relation wherein said reduction-gear connection establishes a zero-speed output of said transmission, and hydraulic pump means carried by said housing and connected to supply pressure fluid to said actuators, the connection from said pump means to said second fluid-pressure operated means including pressure-operated valve means having a member which in one position will pass pressure fluid from said pump means to said second fluid-pressure operated means and a second position which is operative to discharge pressure fluid from said second fluid-pressure operated means, and valve-operating means responsive to a predetermined upper threshold of pressure supplied to said second fluid-pressure operated means for shifting said valve means from said first to said second position.

38. A traction-drive transmission, comprising a housing, a drive shaft journaled for rotation in said housing, two spaced sun wheels having keyed longitudinally relatively slidable support on said shaft, first fluid-pressure operated actuator means connected to axially load said sun wheels in the direction of relative approach to each other, plural like planet wheels axially interposed between and in rolling contact with said sun wheels, a planet-member carrier supported for rotation about the shaft axis and including angularly spaced guide means positioning said planet wheels on angularly spaced axes offset from the shaft axis, whereby each planet wheel may have at least a degree of radial freedom at its guided angular position with respect to said carrier, two reaction rings having antirotational support in said housing and in constant rolling contact with said planet wheels, said antirotational support including an annular member within which said reaction rings are keyed and longitudinally relatively slidable, second fluid-pressure operated actuator means connected to axially load said reaction rings in the direction of relative approach to each other, output-drive means connected to said carrier and responsive to carrier rotation about said axis, said output-drive means including an output shaft with a reduction-gear connection to said carrier, means preloading said sun wheels in the direction of their approach and to an abutment-limited relation wherein said reduction-gear connection establishes a zero-speed output of said transmission, and hydraulic-pump means carried by said housing and connected to supply pressure fluid to said actuators, the connection from said pump means to said second fluid-pressure operated means including valve means positionable to determine whether pressure fluid is supplied to or discharged from said second fluid-pressure operated means, prime-mover means connected to drive said drive shaft, and means responsive to load on said prime-mover means and connected to operate said valve means.

39. The transmission of claim 38, in which said prime-mover means is an electric motor, and in which said last-defined means senses motor current to determine operation of said valve means.

40. The transmission of claim 38, in which said prime-mover means is an internal-combustion engine, and in which said last-defined means senses a load-indicative parameter of said engine to determine operation of said valve means.

41. The transmission of claim 38, in which said prime-mover means is an internal-combustion engine, and in which said last-defined means includes computer means responsive to a plurality of engine-operation parameters and is set to determine operation of said valve means in accordance with a predetermined interrelation of said parameters.

42. A transmission comprising a housing, a drive shaft and a driven shaft journaled for rotation in said housing on a common axis, a variable-ratio coupling mechanism coupling said shafts, pressure-fluid operated control means for varying the instantaneous coupling ratio of said mechanism, said mechanism having yieldable torque-sensitive antirotational support in said housing, said torque-sensitive support including a pressure-fluid control element which is responsive to a change of yielding incremental rotation of said mechanism in the presence of a change of torsional load on said mechanism, said pressure-fluid control element being so operatively connected to said pressure-fluid operated control means as to effectively increase the torque capacity of said coupling mechanism in response to increasing torsional load for a given ratio of said coupling mechanism.

43. A traction-drive transmission, comprising a housing, a drive shaft journaled for rotation in said housing, a rolling-element planetary system including sun-wheel means keyed to said shaft, a gear-element planetary system including sun-gear means keyed to said shaft, planet wheels and planet gears respectively associated with said systems and a planet-member carrier in common for guidance of said planet wheels and planet gears in rotary orbit about the shaft axis, said rolling-element planetary system further including reaction-ring means having yieldable antirotational support in said housing, and said gear-element planetary system having ring-gear means with a transmission-output connection; and pressure-fluid operated control means operative to axially load the engagement of said sun-wheel means and of said reaction-ring means upon said planet wheels to thereby determine the drive ratio of coupling to said drive shaft to said output connection, said control means including means operative in the presence of rotational displacement of said reaction-ring means with respect to said housing in response to a change in torsional load on said transmission, said control means being operatively connected to increase the torque capacity of said transmission in response to increasing torsional load for a given ratio of said transmission.

* * * * *